United States Patent [19]

Keir

[11] 4,020,769
[45] May 3, 1977

[54] CARGO TIE-DOWN GRIPPING ANCHOR ASSEMBLY

[76] Inventor: Donald James Keir, P.O. Box 9, R.R. 1, Winterburn, Alberta, Canada, T0E2N0

[22] Filed: Apr. 17, 1975

[21] Appl. No.: 568,908

[52] U.S. Cl. .............................. 105/481; 24/206 B; 105/476; 294/106
[51] Int. Cl.² ................. A44B 13/00; B25B 25/00; B60P 7/08; B61D 45/00
[58] Field of Search ........................ 9/46; 24/206 B; 105/366 D, 466, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504; 244/118 R, 137 R; 248/499, 500, 503, 505; 114/75; 280/179 A; 294/106, 116

[56] References Cited

UNITED STATES PATENTS

| 2,735,377 | 2/1956 | Elsner | 105/482 |
| 2,895,430 | 7/1959 | Dunlap | 105/485 |
| 3,061,357 | 10/1962 | Wright | 294/106 |
| 3,169,034 | 2/1965 | Epstein | 294/116 |
| 3,417,712 | 12/1968 | Pulcrano et al. | 105/366 D X |
| 3,422,508 | 1/1969 | Higuchi | 105/482 X |
| 3,606,443 | 9/1971 | Painter et al. | 294/106 |

Primary Examiner—Robert J. Spar
Assistant Examiner—Howard Beltran
Attorney, Agent, or Firm—Burns, Doane, Swecker & Mathis

[57] ABSTRACT

A self-energizing cargo tie-down gripping anchor assembly is disclosed for anchoring a tie-down guy to a conventional track having a plurality of spaced apart openings in the rail portion thereof. The anchor assembly includes center body apparatus having a transversely extending pin received by one of the openings in the track. The anchor assembly also includes a pair of gripping members which are pivotally mounted to the center body apparatus and which underline the rail portion of the track to grip the rail both laterally and vertically with serrated edges. Each gripping assembly includes a hook member which extends above the corresponding gripping assembly and towards the opposite gripping assembly such that the pair of hook members define a guy-receiving opening therebetween. The hook members are purposely configured such that a vertical force component acting on a guy is shared by both hook members and is transmitted to the serrated gripping edges of the gripping assemblies. Increased tension of the tie-down guy causes an increased lateral gripping on the track in addition to an increased vertical force on the track assembly.

11 Claims, 6 Drawing Figures

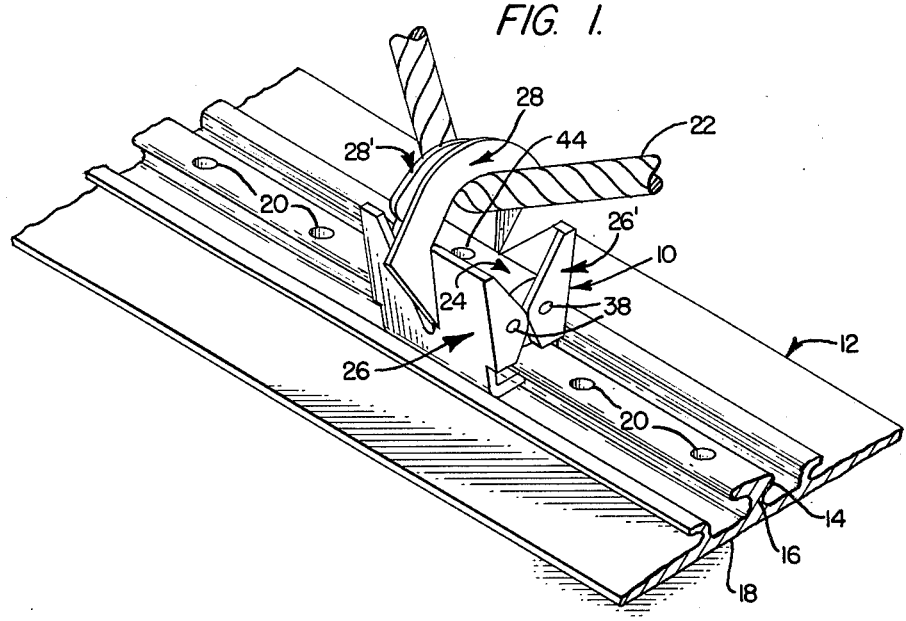
FIG. 1.
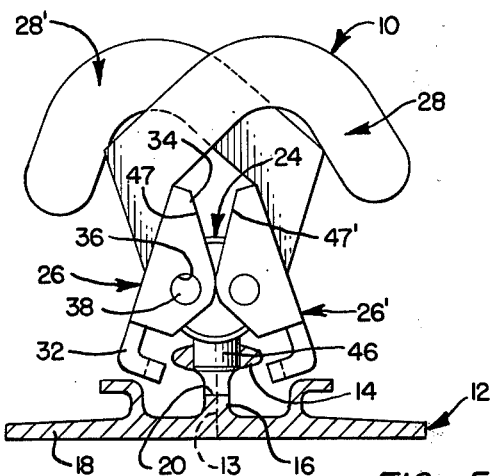
FIG. 4.
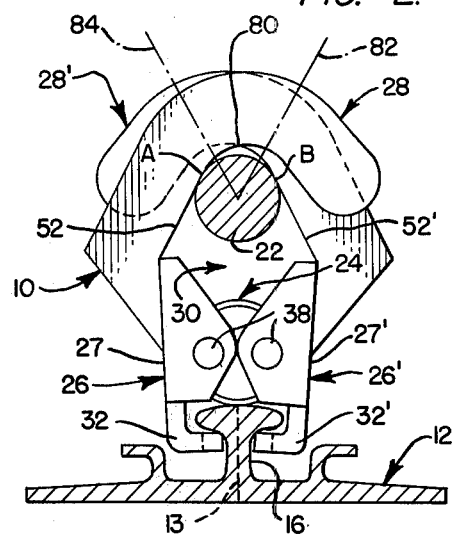
FIG. 2.
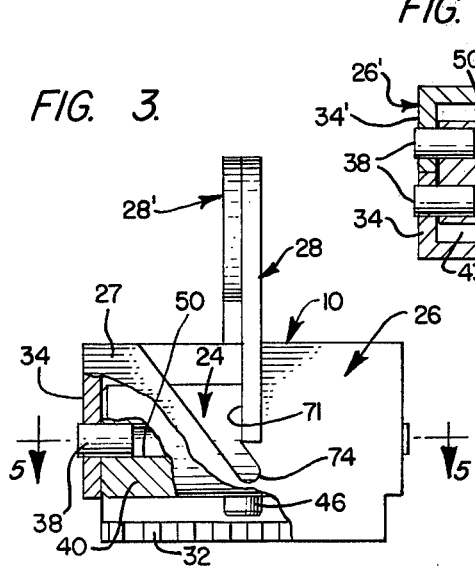
FIG. 3.
FIG. 5.
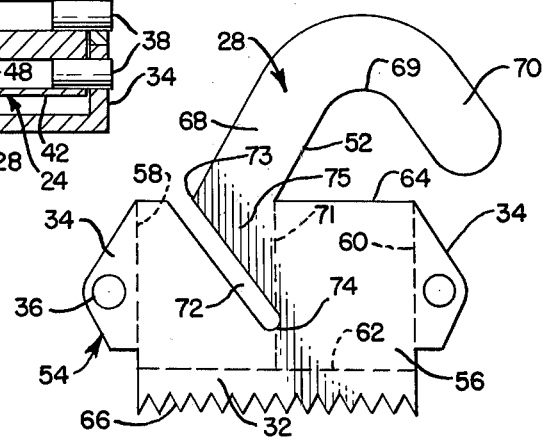
FIG. 6.

CARGO TIE-DOWN GRIPPING ANCHOR ASSEMBLY

BACKGROUND OF THE INVENTION

The invention relates generally to cargo tie-down systems. More specifically, the invention concerns a self-energized tie-down anchor assembly for use in aircraft cargo tie-down systems.

In the past, anchor assemblies have been used in combination with longitudinally extending track members to secure various types of cargo in position with respect to a transporting vehicle. In some such anchors, a pin or other suitable projection is engaged in a corresponding recess of the track to longitudinally position the anchor. Vertical loads imparted to the anchor by tie-down straps are typically resisted by a pair of laterally rigid fingers carried by the anchor and underlying a rail portion of the track. The fingers to not assist longitudinal positioning of the anchor.

Other known anchor assemblies employ specially designed track members having periodic interruptions to facilitate anchor positioning. These anchors are longitudinally restrained with respect to the track by frictional engagement of anchor fingers with upper and lower horizontally extending surfaces of the track rail. The anchor fingers cooperate with the track rail to resist vertical loads induced by tie-down straps. Again, increased vertical loads do not augment resistance to longitudinal movement.

In aircraft cargo stowage applications, it is particularly desirable to provide a back-up system resisting longitudinal movement of the anchor since shifting cargo may induce random pitching or rolling moments that could lead to loss of aircraft control. Moreover, during landing and takeoff, large acceleration forces are incurred which may induce cargo shifting with the consequent possibility of damage. Accordingly, known positioning projections and track rail engaging devices are inadequate. In addition, the tendency of anchor fingers to straighten under vertical load is also highly undesirable since it may lead to cargo shifts and loss of aircraft control.

While a redundant, or back-up system is advantageous, weight, mechanical, and economic considerations preclude combinations of the known anchor assemblies. Moreover, weight considerations place a premium on the efficient structural design of any apparatus to be used on aircraft.

In view of the foregoing considerations, it will be apparent that a need still exists for an inexpensive, light, easily positioned anchor for use with standard track configurations while being tolerant of increased force loadings and tolerant of inclined force loadings.

OBJECTS AND SUMMARY OF THE INVENTION

Accordingly, a general object of the present invention is to provide an improved anchor assembly which overcomes problems of the type noted.

It is a more specific object of the present invention to provide a novel self-energizing anchor assembly having redundant means for longitudinally positioning the anchor assembly with respect to a track assembly.

Another object of the present invention is to provide a novel self-energizing anchor assembly having redundant means for longitudinal positioning and means for laterally engaging a cooperating track assembly.

A further object of the present invention is to provide a novel self-energizing anchor assembly which is constructed so that track gripping edges are exposed to a force moment which tends to cause increased bending thereof in opposition to deformation moments resulting from vertical force loads on the anchor assembly.

Yet another object of the present invention is to provide a novel anchor assembly which grips an associated track assembly with a force that increases proportionately in response to tension increases in a tie-down guy attached to the anchor assembly.

A yet further object of the present invention is to provide a novel anchor assembly which is economically fabricated from light inexpensive members and which provides a redundant track engaging member suitable for use in aircraft.

Still another object of the present invention is to provide a novel method of attaching a tie-down anchor assembly to an associated track assembly.

A preferred embodiment of a cargo tie-down anchor assembly constructed in accordance with the present invention includes a center body assembly having a pair of generally parallel side portions and a plurality of hinge pins. The center body assembly may include a transversely extending projection adapted to locate the anchor assembly longitudinally with respect to a track assembly when the transversely extending projection is positioned in a recess of the track rail. The transversely extending projection is also effective to provide shearing resistance against sliding of the locating means with respect to the rail when the anchor assembly is withstanding a load induced by a tie-down strap.

The tie-down anchor assembly further includes a pair of self-energizing gripping assemblies which are pivotally mounted on the hinge pins so that an edge portion of each gripping assembly partially underlies the locating assembly and is spaced therefrom. The gripping assembly cooperates with the supporting track assembly both to laterally engage the web portion of the track assembly and to vertically engage the rail portion thereof.

In addition, each gripping assembly may be pivotally moved to an open position for positioning of the transversely extending projection with respect to a track assembly. Subsequently, each gripping assembly is pivoted to a closed position such that a gripping edge partially underlies the rail portion of the track assembly thereby mechanically restraining vertical disengagement from the track assembly.

To facilitate connection with the anchor assembly of a guy, a pair of hook assemblies are included in the self-energizing assembly and cooperate to define a guy-receiving opening above the center body assembly. Each hook assembly is carried by a corresponding gripping assembly and extends above the gripping assembly toward the opposed gripping assembly. Each hook assembly, in addition, has a bearing surface against which a tie-down guy pushes while being restrained.

The hook assemblies, moreover, are configured to increase the lateral gripping force on the track in response to an increased tension on the tie-down guy. In this manner, forces on the tie-down guy are resisted not only by the rail portion of the track but are also resisted by friction between the gripping members and the web portion of the track assembly. The gripping members also provide resistance against longitudinal movement of the tie-down anchor assembly along the track member by virtue of frictional engagement therebetween.

Each gripping assembly may include a body portion substantially coextensive with the center body assembly and a pair of ears which extend from the body portion toward end portions of the center body assembly where they are pivotally mounted on the hinge pins. In this manner, the ears provide a method for spacing the body portion from the center body assembly so that there can be pivotal movement of the body portion with respect to the center body assembly. Moreover, the ears function as reinforcing ribs for the body portion. Each gripping assembly may also include a gripping projection extending from the lower edge of the body portion toward the locating assembly and may include a serrated edge to improve frictional engagement with the track assembly.

Each hook assembly may be integrally connected to a body portion of the corresponding gripping assembly such that the gripping assembly and the corresponding hook may be formed simultaneously. Accordingly, each gripping assembly and the associated hook member may be integrally formed by stamping a suitably configured blank which is then formed by bending the hook, ears, and gripping projection to provide an appropriately configured gripping assembly-hook assembly combination.

BRIEF DESCRIPTION OF THE DRAWINGS

The above and many other objects of the present invention will be apparent to those skilled in the art when this specification is read in conjunction with the appended drawings disclosing a preferred embodiment of the invention wherein like reference numerals have been applied to like elements and wherein:

FIG. 1 is a perspective view of a self-energizing tie-down anchor assembly in accordance with the preferred embodiment of the invention;

FIG. 2 is an end view of a tie-down anchor assembly illustrating the anchor assembly in closed position engaging the track member;

FIG. 3 is a side view of the tie-down anchor assembly with portions broken away to illustrate the orientation of a hinge pin and the positioning pin;

FIG. 4 is an end view in partial cross-section of the tie-down anchor assembly, similar to FIG. 2, illustrating a positioning pin received by a corresponding recess in the track member;

FIG. 5 is a partial cross-sectional view taken along line 5—5 of FIG. 3; and

FIG. 6 is a plan view of a blank from which the hook and gripping assembly of the tie-down anchor may be formed.

Description of the Preferred Embodiment

Turning now to FIG. 1, a self-energizing tie-down anchor assembly 10 is illustrated in operating position with respect to a track assembly 12. The cross-section of track assembly 12 is symmetric about line 13 (see FIG. 2) and includes a rail portion 14 which is carried at the top of a web portion 16 that, in turn, extends generally perpendicularly from a relatively wide mounting flange portion 18. The elongate track assembly 12 which may comprise a standard seat track section is provided with a plurality of uniformly spaced apart openings (see FIG. 1) that receive a positioning projection of the anchor assembly 10. Each opening 20 may be generally circular in cross-section and extend from the upper surface of the rail portion 14 downwardly and into the web portion 16 as illustrated in FIG. 4. Preferably the openings 20 are centrally positioned in the rail portion 14 so that the anchor assembly will be centrally located.

The track assembly 12 is typically affixed to a planar surface of an aircraft cargo storage compartment (not shown). Ordinarily a plurality of the generally parallel track assemblies are spaced at generally uniform intervals along the planar surface. The plurality of the track assemblies facilitates cargo stowing flexibility and makes possible the restraint of cargo from shifting during transportation and while undergoing positive and negative acceleration.

With reference to FIG. 1, it will be seen that a suitable cargo tie-down guy 22 is engaged by the anchor assembly 10. The cargo tie-down guy 22 may comprise, for example, a flexible web, a flexible cable, or the like adapted to be positioned around miscellaneous pieces of cargo to restrain them from shifting during transportation. While the guy 22 is depicted in direct contact with the anchor assembly 10, it will be appreciated that the guy 22 may be connected to a ring of metal, or the like, which is restrained by the anchor assembly 10.

The self-energizing anchor assembly 10 (see FIG. 1) may include a locating assembly or center body assembly 24 having a pivotally mounted gripping assembly 26, 26' on each side of the locating assembly 24. Extending upwardly from the upper portion of each gripping assembly 26, 26' is a corresponding hook member 28, 28'. Each hook member 28, 28' extends above the locating assembly 24 and toward the other gripping assembly such that a guy receiving space 30 is defined (see FIG. 2). The hook members 28, 28' are closely positioned axially of the locating means 24 (see FIG. 3) to reduce twisting moments which might otherwise be exerted on the anchor assembly 10 by a tie-down exerting an outwardly directed force on each of two axially spaced hook members 28, 28'.

Each gripping assembly 26, 26' (see FIG. 1) is substantially identical to the other gripping assembly. The gripping assembly 26' is rotated 180° with respect to gripping assembly 26 so that the locating assembly 24 may conveniently be disposed therebetween. The identical configuration of both gripping assemblies 26, 26' permits an economy in production costs since only two parts need to be manufactured, namely the locating assembly 24 and the gripping assembly 26. Since the gripping assemblies 26, 26' are identical, their further description may proceed by merely referencing the features of one gripping assembly 26. It is understood that the other gripping assembly 26' has similar features which are designated by the same reference numeral but distinguished by adding a superscript (').

Turning now to FIG. 2, each gripping assembly 26, 26' is provided with a serrated edge portion 32 which extends toward the track assembly 12. By comparing FIGS. 2 and 4, it will be observed that the serrated edge portion 32 is adapted to underlie the rail portion 14 of the track assembly 12 when the anchor assembly 10 is in the operating position. In addition, the edge portion 32 may be opened so that the rail portion 14 will pass between the opposed edge portions 32, 32' to facilitate positioning of the anchor assembly 10 on the track assembly 12.

When the anchor assembly is in the operating position (see FIG. 2), the opposed serrated edge portions 32, 32' cooperate with the web portion 16 of the track assembly 12 so that the hook members 28, 28' are partially nonaligned. This partially nonaligned configuration between the oppositely facing hooks 28, 28' assures that the serrated gripping edge 32 is laterally urged into engagement with the web portion 16, as will be described.

The edge portion 32 may extend generally perpendicularly from the gripping assembly 26 and may extend from the gripping assembly 26 for a length which causes the upstanding portions 27, 27' of the gripping assemblies 26, 26' to be convergent in a direction toward the track assembly 12. This convergence of the upstanding portions 27, 27' assists the edge portions 32, 32' to resist bending when subjected to vertical loads.

Each gripping assembly 26 is provided with a pair of ears 34 (see FIG. 5) which project toward the locating assembly 24. Each ear 34 is provided with a generally circular opening 36 (see FIG. 4) which receives a generally cylindrical hinge pin 38 projecting from a corresponding end of the locating assembly 24. In this manner the gripping assembly 26 is pivotally mounted on the hinge pins 38 such that the gripping assembly 26 is parallel to and spaced from a side portion of the locating assembly 24 (see FIG. 5).

The locating assembly 24 may include a circularly cylindrical center body member 40 having generally parallel side portions 42 adjacent the spaced gripping assemblies 26, 26'. The space 43 provided between the side portions 42 and the gripping assembly 26, 26' permits the gripping assembly 26 to pivot with respect to the circularly cylindrical center body member 40. The space 43 may be selected such that mechanical contact between the inner surface 41 of the gripping assembly 26 and the circularly cylindrical surface 45 of the center body member 40 limits the pivotal movement of the gripping assembly 26 with respect to the locating assembly 24 (see FIG. 4). Alternately, the space 43 may be selected at a larger value so that an upper beveled surface 47 of each ear 34 meets the upper beveled surface 47 of the other gripping member to limit the pivotal movement.

It will, however, be apparent to those skilled in the art that a suitable cylindrical configuration of the center body member 40 may be devised which would eliminate or substantially reduce the amount of space required. Accordingly, any generally cylindrical center body member 40 might be employed for the locating assembly 24. Thus, as used herein, cylindrical is intended to encompass any cylindrical surface within the mathematical definition. Returning to FIG. 5, the elongate center body member 40 is provided with a transverse circularly cylindrical bore 44 which extends through the center body member 40. The transverse bore 44 is adapted to receive a transverse positioning projection which may be a circularly cylindrical pin 46 (see FIG. 4). The transverse bore 44 includes a bore axis 48 which may be generally aligned with the line of symmetry 13 for the track assembly 12 (see FIG. 4).

The center body member 40 (see FIG. 5) is provided with a pair of longitudinally extending circular bores 50 which are symmetrically disposed with respect to the transverse bore 44 and which are spaced generally perpendicularly from the bore axis 48. The end of each longitudinal bore 50 is provided with a circular hinge pin 38 which is suitably secured therein. Accordingly, each hinge pin 38 extends longitudinally from one end of the center body member 40 for pivotally receiving an ear 34, 34' (see FIGS. 3 and 5) of a gripping assembly 26, 26'.

As noted, each hook member 28, 28' (see FIG. 2) is connected to the corresponding gripping assembly 26, 26'. Preferably, however, each hook member 28, 28' is integral with the corresponding gripping assembly 26, 26'. Each hook member, 28, 28' in addition, is provided with a bearing surface 52, 52' on the edge adjacent the guy-receiving opening 30. The bearing surfaces 52, 52' of the hooks 28, 28' are effective to increase the lateral force on the corresponding serrated edge portions 32, 32' when a tension increase occurs on the guy 22.

Turning now to FIG. 6, a blank 54 is illustrated from which the gripping assemblies 26, 26' and integral hook members 28, 28' may be readily formed. For economical production, the blank 54 may be, for example, stamped from a sheet of 12 gauge steel with a configuration as illustrated in FIG. 6. The blank 54 includes a generally rectangular body portion 56 having a length substantially coextensive with the longitudinal length of the locating assembly 24. The body portion 56 has two ends 58, 60, a lower edge 62 and an upper edge 64. Connected to each end 58, 60 is one of the ears 34, to which reference was made earlier. Each ear 34 includes the generally circular hinge pin opening 36.

Extending along the lower edge 62 of the body portion 56 is the edge portion 32. The edge portion 32 may be provided with a plurality of triangular points which define a serrated edge 66 or with any other suitable friction increasing edge surface.

The blank 54 is provided with a hook portion 68 which extends from the upper edge 64 thereof at a suitable angle. An angle of approximately 60° has been found to be adequate. The hook portion 68 includes the bearing surface 52 which extends upwardly from the upper edge 64 at approximately the midpoint of the upper edge 64 of the blank 54 and includes a circular arc portion 69 which subtends an arc of approximately 60°. The hook portion 68 also includes an end portion 70 which projects downwardly from the circular arc portion at an angle of approximately 60° toward the upper edge 64 of the blank 54. The width of the hook portion 68 in the plane of the blank 54 is preselected to provide a cross-section having mechanical properties which will withstand anticipated forces to be encountered. In addition, the circular arc portion 69 is spaced from the openings 36 so that a mechanical advantage of 2:1 or more is obtained between forces acting on the bearing surface 52 near the arcuate portion 69 and forces exerted by serrated edge 32 against a track.

Angularly extending from the upper edge 64 of the blank 54 is an inclined channel 72 having a stress relieving end 74 which continues beyond the midline 71 of the body portion 56. The inclined channel 72 is positioned such that its upper end is closer to the first end 58 than to the second end 60 of the body portion 56. In addition, the channel 72 defines a corner 73 between the upper hook portion 68 and a lower hook portion 75.

A gripping assembly may be readily fabricated from the blank 56 by bending each ear 34 downwardly around the first and second ends 58, 60, respectively, out of the plane of the body portion 56 and until the ears 34 are generally perpendicular to the body portion 56. Similarly, the serrated edge portion 32 is bent downwardly around the lower edge 62 until the edge portion projects generally perpendicularly.

The hook assembly 28 is formed by bending the hook portion 68 about a line parallel to midline 71 and spaced therefrom toward the second end 60 by a distance at least equal to the thickness of the blank 56. The hook portion 68 is thus formed so that it extends perpendicularly with respect to the body portion 56 and so that one surface is close to the midline 71, as illustrated in FIG. 3. The hook assembly 28 thus opens a generally V-shaped notch in the upstanding portion of the gripping assembly 26 to which it is integrally connected. Moreover, the hook assembly 28 extends along the midline 71 to a line connecting the openings 36 so that forces imparted to the hook are reacted by the upper portion of the body portion 56.

By thus forming a gripping assembly 26, the mechanical properties of its cross-section are enhanced. More specifically, the ears 34 and the hook 28 function as stiffening ribs for the gripping assembly 26 (see FIG. 5). This feature is particularly advantageous where, as here, the gripping assembly will be subjected to bending stresses.

In operation, the self-energizing anchor assembly 10 (FIG. 1) is positioned and attached to the track assembly 12. Before positioning, the upper edge portions of each gripping assembly are pushed toward one another thereby pivoting the corresponding serrated edge portions 32, 32' to their most spaced apart location to expose the positioning projection 46 if present (see FIG. 4). Positioning is then effected by slipping the serrated edge portions 32, 32' over the rail portion 14. In addition, a positioning projecting 46 may be inserted in a selected hole 20 (FIG. 1) of the track assembly 12. In this manner, the anchor assembly is positively positioned longitudinally with respect to the track assembly 12 and cannot move without shearing the positioning projection 46.

The gripping assemblies 26, 26' are then pivoted toward the position illustrated in FIG. 2 with the serrated edge portions 32, 32' partially underlying the rail portion 14 and the positioning projection 46. Moreover, the serrated edge portions 32, 32' are in position to exert both lateral and vertical forces on the track assembly 12.

Either prior to or subsequent to attachment of the anchor assembly 10 to the track assembly 12, the tiedown guy 22 may be passed through the guy-receiving opening and thereby operably positioned with respect to the anchor assembly 10. With the anchor assembly 10 attached to the track assembly and the guy 22 operably positioned, force may be applied to the guy 22 to effect self-energizing tightening of the anchor assembly 10.

The force applied to the guy 22 may result in part from simply tightening the guy in contact with cargo. In addition, impulsive forces generated by acceleration and deceleration of the transporting vehicle may be exerted by cargo on the guy 22 causing tension increases therein. The tension increase acts through the self-energizing anchor 10 to pivot hooks 28, gripping assembly 26 and serrated edge portion 32 into increased lateral engagement with the track 12. The mechanical advantage between the hook assembly 28 and the edge portion 32 serves to multiply the force exerted laterally.

As illustrated in FIG. 2, the guy 22 is restrained by contact points A, B on bearing surfaces 52, 52', respectively, with a space 80 above the guy 22. This two point restraint on the guy 22 is effected by the nonalignment of hook assemblies 28, 28'. It will now be seen that the nonalignment must be such that serrated edge portion 32, 32' engage the track assembly 12 before the circular arc portions 69, 69' of the hook assemblies 28, 28' attain alignment.

In FIG. 2, lines 82, 84 pass through the center of guy 22 and are parallel, respectively, to tangents of the bearing surfaces 52, 52' at points A, B. By keeping the resultant force vector on the guy 22 within the angular range defined by the lines 82, 84, the hook assemblies 28, 28' both share the force load on the guy 22. Guys 22 having a diameter smaller than that illustrated in FIG. 2 will have contact points on the circular arc portion of the bearing surfaces 52, 52'. Accordingly the angular range within which the resultant force vector must lie will be increased.

Forces from the guy 22 within the operative angular range urge the hook assemblies 28, 28' apart and tend to pivot the gripping assemblies 26, 26' about the hinge pins 38 such that the serrated edge portions 32, 32' laterally engage the track assembly 12. An increase in tension in the guy 22 causes proportionately increased forces on the hook assemblies 28, 28' and, therefore, proportionately increased lateral engagement forces between the serrated edge portions 32, 32' and the track assembly. Thus, the force intensity or pressure of lateral engagement between the serrated edge portions 32, 32' and the track assembly is responsive to and varies directly in accordance with tension in the guy. Moreover, tension increases in the guy 22 may cause slight outward movement of the hook assemblies 28, 28' relative to the space 30 so that the allowable angular range increases.

At least a portion of the vertical component of the resultant force vector is resisted by mechanical interference between the serrated edge portion 32, 32' and the rail portion 14 thereby causing a force moment tending to straighten the edge portion with respect to the corresponding gripping assembly. This straightening force moment is counteracted in part by another force moment caused by force exerted by the track 12 on the end of the upwardly sloping serrated edge portion.

It will now be apparent that the anchor assembly of the present invention is advantageously self-energized and positively restrains a guy longitudinally with respect to a track assembly by both lateral and vertical engagement therewith, thereby providing an improved anchor. And, a redundant longitudinal restraint may be readily provided by using a positioning pin extending from the anchor into the track.

In addition, the anchor assembly advantageously increases its lateral grip of the track assembly in response to tension increases in the guy thereby reducing the likelihood of accidental disconnection or slipping.

Further, the inexpensive manufacture of an anchor assembly is advantageously facilitated by using stamped and formed parts requiring only minimal maching operations.

Moreover, the anchor assembly of the present invention advantageously permits the use of conventional track members while minimizing the need for periodic transverse discontinuities and making fll use of mechanical properties of the track cross-section.

It should now be apparent that there has been provided, in accordance with the present invention, a tiedown anchor assembly which substantially meets the objects and advantages set forth above. Moreover, it will be apparent to those skilled in the art that many modifications, variations, substitutions and equivalents may be made without departing from the spirit and scope of this invention. Accordingly, it is expressly intended that all such modifications, variations, substitutions and equivalents as fall within the spirit and scope of the invention as defined in the appended claims be embraced thereby.

What is claimed is:

1. In an aircraft cargo tie-down system having elongate track means for flexibility in stowing cargo and tie-down guy means for restraining cargo from shifting, an improved tie-down clamp means for releasably anchoring the guy means to the track means comprising:
  locating means having longitudinally extending hinge pin means and a transverse projection received by one of a plurality of openings in the track means, and being operable to position the clamp means longitudinally on the track means;
  a pair of gripping means, each gripping means being pivotally mounted on the hinge pin means,
    operable to laterally engage the track means, and
    operable to underlie a rail portion of the track means; and
  a pair of hook means, each hook means
    carried by a corresponding gripping means,
    extending above the corresponding gripping means and toward the other gripping means,
    having a bearing surface for partially supporting the guy means against movement, and
    operable to increase lateral force on the track means when tension increases in the guy means.

2. The aircraft cargo tie-down system of claim 1 wherein each gripping means includes a serrated edge portion for engagement with the track means, the serrated edge portion being operable to inhibit displacement of the clamp means with respect to the track means.

3. The aircraft cargo tie-down system of claim 1 wherein each hook means is integrally formed with the corresponding gripping means to aid the transfer of force therebetween.

4. The aircraft cargo tie-down system of claim 3 wherein each hook means and the corresponding gripping means are integrally formed from a stamped blank to facilitate the economical production thereof.

5. The aircraft cargo tie-down system of claim 1 wherein each hook means is positioned closely adjacent the midline of the corresponding gripping means so that the pair of hook means are closely positioned to one another vertically above the locating means to reduce twisting moments resulting from tension in the guy means.

6. The cargo tie-down system of claim 1 wherein:
  the locating means also includes a center body means including a pair of generally parallel side portions and the hinge pin means;
  each of the gripping means is pivotally mounted adjacent to a corresponding side portion and has an upper portion and a lower portion, the lower portion being provided with gripping edge means; and
  the pair of hook means defining a guy-receiving opening above the center body means, each hook means
    carried by the upper portion of the corresponding gripping means,
    having the bearing surface contacting the guy means, and
    operable to urge the corresponding gripping edge means toward the other gripping edge means in response to a force exerted against the bearing surface by the guy means.

7. A tie-down anchor assembly comprising:
  locating means including a pair of generally parallel side portions, hinge pin means and having a transversely extending positioning projection;
  a pair of gripping means, each gripping means being pivotally mounted adjacent to a corresponding side portion of the locating means and having an edge portion operable to underlie the locating means while being spaced therefrom; and
  a pair of hook means cooperating with the locating means to define a guy-receiving opening above the locating means, each hook means carried by an upper portion of a corresponding gripping means,
    extending beyond the corresponding gripping means and toward the other gripping means,
    having a bearing surface, and
    operable to urge the corresponding edge portion toward the edge portion of the other gripping means in response to a force exerted by a guy against the bearing surface and operable to increase lateral force tending to move the edge portions together in response to an increase in the exerted force.

8. The anchor assembly of claim 7 wherein the locating means includes:
  an elongate, generally cylindrical center body means having a transverse bore with an axis and a pair of symmetrically disposed longitudinal bores spaced generally perpendicularly from the transverse bore axis;
  a generally cylindrical positioning pin received by the transverse bore and projecting outwardly from the center body means; and
  a plurality of hinge pins, each hinge pin being received by an end of a corresponding longitudinal bore.

9. The anchor assembly of claim 7 wherein each gripping means includes:
  a body portion substantially coextensive with the locating means having two ends, a lower edge and an upper edge;
  a pair of ears, each ear connected to a corresponding end of the body portion, extending toward the locating means and having an opening in which a corresponding hinge pin is disposed for pivotal mounting of the body portion with respect to the locating means;
  a gripping projection connected to the lower edge of the body portion, extending toward the locating means and having a serrated edge; and
  one of the hook means integrally connected adjacent to the midpoint of the upper edge and extending generally perpendicularly toward the locating means.

10. A method of anchoring a tie-down guy to a track having a laterally-extending rail portion and a plurality of spaced-apart openings in the rail portion comprising the steps of:
  providing a cable anchor assembly for a tie-down guy having gripping edges pivotally mounted for movement toward lateral engagement with a track below the rail portion and including an anchor positioning projection;
  longitudinally positioning the cable anchor assembly relative to the track by inserting the projection of the cable anchor assembly into one opening of the flange;

operably connecting a tie-down guy with the gripping edges of the cable anchor assembly to cause pivotal movement of the gripping edges into lateral engagement with the track below the rail portion when tension is applied to the tiedown guy; and, increasing lateral gripping engagement of the track by the gripping edges in response to increasing tension in the tiedown guy.

11. A cargo tie-down anchor comprising:

a circularly cylindrical center body member having
- a transverse bore with a circularly cylindrical pin projecting outwardly therefrom for engaging a track, and
- a pair of longitudinal bores symmetrically spaced in a diametrical plane perpendicular to the transverse bore and having a hinge pin projecting outwardly from each end;

a pair of members, each member having
- a body portion with an upper edge, a lower edge, and two ends,
- a pair of ears, each ear connected to a corresponding end of the body portion, extending generally perpendicularly therefrom, and having an opening in which one hinge pin is received to pivotally mount the body portion on the center body member,
- a serrated edge portion extending generally perpendicularly from the lower edge of the body portion in the same direction as the ears and spaced from the center body member to receive a track rail therebetween for lateral engagement below the rail portion thereof, and
- a hook connected to the upper edge of the body portion adjacent the midpoint thereof, generally perpendicularly extending on both sides of the plane of the body portion, extending beyond the upper edge of the body portion toward the other member, having a bearing surface and cooperating with other hook to define a guy-receiving opening in which a guy engages the bearing surface of each hook.

* * * * *